UNITED STATES PATENT OFFICE.

JOHN MURPHY, OF NEW YORK, N. Y.

IMPROVEMENT IN VULCANIZED INDIA-RUBBER VALVES.

Specification forming part of Letters Patent No. 211,340, dated January 14, 1879; application filed August 14, 1876.

*To all whom it may concern:*

Be it known that I, JOHN MURPHY, of the city, county, and State of New York, have invented certain new and useful Improvements in the Manufacture of Vulcanized India-Rubber Valves; and I do hereby declare that the following is a full, clear, and exact description thereof, which will enable others skilled in the art to which it appertains to make and use the same.

Valves when made of vulcanized india-rubber are soon spoiled or injured if they come in contact with oil, as is generally the case when used about machinery. This difficulty has been remedied by compounding with the rubber a large quantity of metal filings, metallic oxides, and earths. This, however, to some extent, injures the elasticity, and forms a valve which does not pack or close well, in a movable valve especially.

I have ascertained that by using a mixture of rubber and gutta-percha a vulcanized valve may be produced which will resist the action of oils, and form a close-fitting valve.

My invention therefore consists in forming valves or material to be cut into valves by combining or mixing india-rubber and gutta-percha in suitable proportions, with or without the addition of oxides, earths, or metallic salts, such as have been heretofore used in making vulcanized soft-rubber compounds.

The following description will enable others to make and use my invention.

I take raw or green rubber in its plastic state, and add to it a portion of clean gutta-percha. These are thoroughly mixed together with the addition of sulphur, in the proportion usual in forming soft or elastic rubber goods. With this prepared compound I then form the valves in the proper shape by molding or otherwise, and then vulcanize by heat in the usual way well known to rubber manufacturers.

For flat valves it may be rolled into sheets and vulcanized, and the valves cut from the sheets. The valves thus formed will effectually resist the action of oil.

Where it is desirable to give more or less rigidity to the valves, earthy oxides and salts may be combined with other materials named above.

I find a suitable proportion to be two parts of rubber and one part of gutta-percha, with or without the addition of the materials used for stiffening the compound.

Having thus described my invention, what I claim, and desire to secure by Letters Patent of the United States, is—

As a new article of manufacture, the elastic valve herein described, composed of vulcanized rubber and gutta-percha, in about the proportion of two parts of the former to one of the latter, with or without the addition of metallic earths and oxides, substantially as set forth.

In testimony that I claim the foregoing as my own I affix my signature in presence of two witnesses.

JOHN MURPHY.

Witnesses:
BENJN. P. SMITH,
H. W. HEWITT.